A. C. BOWEN.
ROAD DRAG AND LEVELER.
APPLICATION FILED JUNE 25, 1917.

1,267,623.

Patented May 28, 1918.
2 SHEETS—SHEET 1.

Witness.
Hal H Hyland.

Inventor.
Alpheus C. Bowen.
By Orwig & Bair, Att'ys.

UNITED STATES PATENT OFFICE.

ALPHEUS C. BOWEN, OF DES MOINES, IOWA.

ROAD DRAG AND LEVELER.

1,267,623.  Specification of Letters Patent.  Patented May 28, 1918.

Application filed June 25, 1917. Serial No. 176,891.

*To all whom it may concern:*

Be it known that I, ALPHEUS C. BOWEN, a citizen of the United States, and resident of Des Moines, in the county of Polk and State of Iowa, have invented a certain new and useful Road Drag and Leveler, of which the following is a specification.

My invention relates to road machines for dragging and leveling roads.

The object of my invention is to provide a road drag and leveler having a supporting frame mounted on wheels, and having sections operatively connected with said frame, the entire device being particularly adapted to be operated by means of a tractor.

Still a further object is to provide such a device having a removable draw bar member operatively connected with some of the sections of the drag and leveler in such manner that when the draw bar is in its forward position, the drag sections connected therewith will be in proper position for dragging and leveling the road, whereas when the draw bar is moved to its rearward position of movement, said sections will be swung inwardly and forwardly for reducing the entire width of the machine.

Still a further object is to provide such a device having the draw bar and some of the sections so connected that when the draw bar is at its rearward position, the forward end of the drag sections connected therewith will be raised above the ground on which the machine is traveling.

Still a further object is to provide such a machine having means, whereby the draw bar may be locked in a variety of its sliding positions for thereby regulating the positions of the drag sections connected with such draw bar.

Still a further object is to provide such a device having a rear drag member so mounted as to be automatically raised when the draw bar is moved to the rearward limit of its movement.

With these and other objects in view, my invention consists in the construction, arrangement, and combination of the various parts of the device, whereby the objects contemplated are attained, as hereinafter more fully set forth pointed out in my claims, and illustrated in the accompanying drawings, in which:

Figure 4:
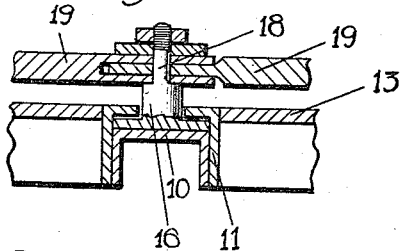
Fig. 4 shows a vertical, sectional view taken on the line 4—4 of Fig. 2.

My improved drag comprises a frame supported on wheels.

In the accompanying drawings, I have used the reference numeral 10 to indicate generally a downwardly opening channel, forming a frame member extending fore-and-aft through the central part of the machine.

Figure 3:
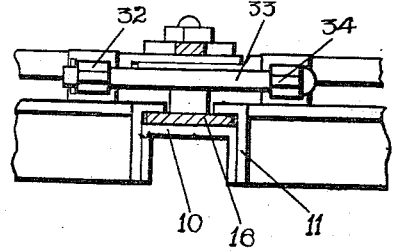
Fig. 3 shows a sectional view taken on the line 3—3 of Fig. 1.
Figure 1:
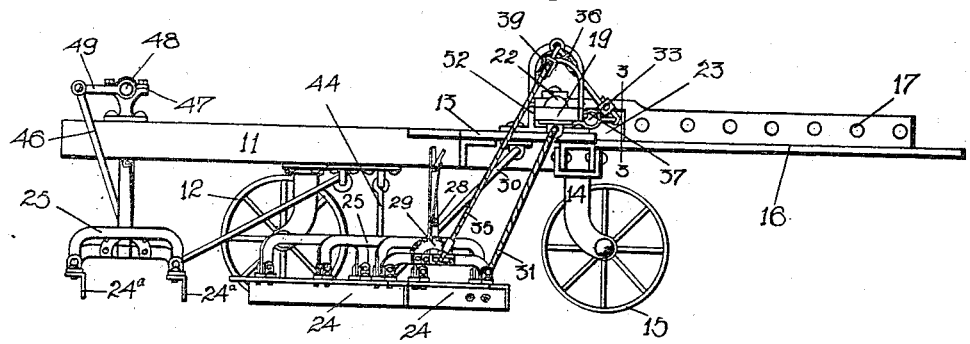
Figure 1 shows a side elevation of a road drag and leveler embodying my invention.

Secured to each side of the frame member 10 is an angle bar 11, which extends upwardly above the frame member 10, and has at its upper end an inwardly extending flange, as shown in Fig. 3.

Suitably mounted below the frame member 10 between the ends thereof is a caster wheel 12.

Supported on the frame members 11 and 10, near the forward ends thereof is a platform 13. Mounted on the platform 13 are downwardly extending arms 14 on which are mounted supporting wheels 15. The wheels 15 are spaced from each other on opposite sides of the frame member 10.

I provide a draw bar 16 having the form of a T-iron with opposite flanges received in the guide-way formed between the frame members 10 and 11, as illustrated in Fig. 3. The upwardly extending flange of the draw bar has a plurality of spaced openings 17, the function of which will be hereinafter referred to.

Spaced from the rear end of the draw bar is an upwardly extending pin 18, on which are pivotally mounted two slide bars 19. Each of the slide bars is provided with a longitudinally arranged slot 21. A pin 22 extends upwardly from the platform 13 on opposite sides of the draw bar and through one of the slots 21, as clearly illustrated in Fig. 2. It will be seen that by sliding the draw bar rearwardly or forwardly, they slide and move pivotally on the pins 22 from their position shown by full lines in Fig. 2 to their position shown by dotted lines in said figure and vice versa.

The upwardly extending flange on the draw bar is provided with a slot 23 located in front of the pin 18 for receiving the corners of the slide bars for permitting them to approach more closely to each other when the draw bar is moved to its rearward position.

I preferably connect with each slide bar a drag member as in the manner now to be described.

Each drag member preferably comprises a pair of spaced angle irons 24, each arranged with one downwardly extending flange, and having at its upper end a rearwardly extending flange.

Pivoted to each of the horizontal rearwardly extending flanges of each drag member is a downwardly extending arm of a downwardly opening U-shaped connecting bar 25. I preferably use three of the connecting bars 25 on each of the bracket members connected with the draw bar.

Pivotally connected in a similar way with the angle-irons of each of the bracket members now described, adjacent to one of the connecting bars 25 is an additional connecting bar 26, extending higher than the adjacent connecting bar 25.

Pivoted to each connecting bar 26 is a lever 27 having its lower end pivoted to the adjacent bar 25 and having a pawl 28 adapted to coact with a sector 29 on the said adjacent connecting bar 25. The lever 27 may be used for varying the angles of the downwardly extending flanges of the drag members with relation to the ground over which the machine is traveling.

Figure 2:
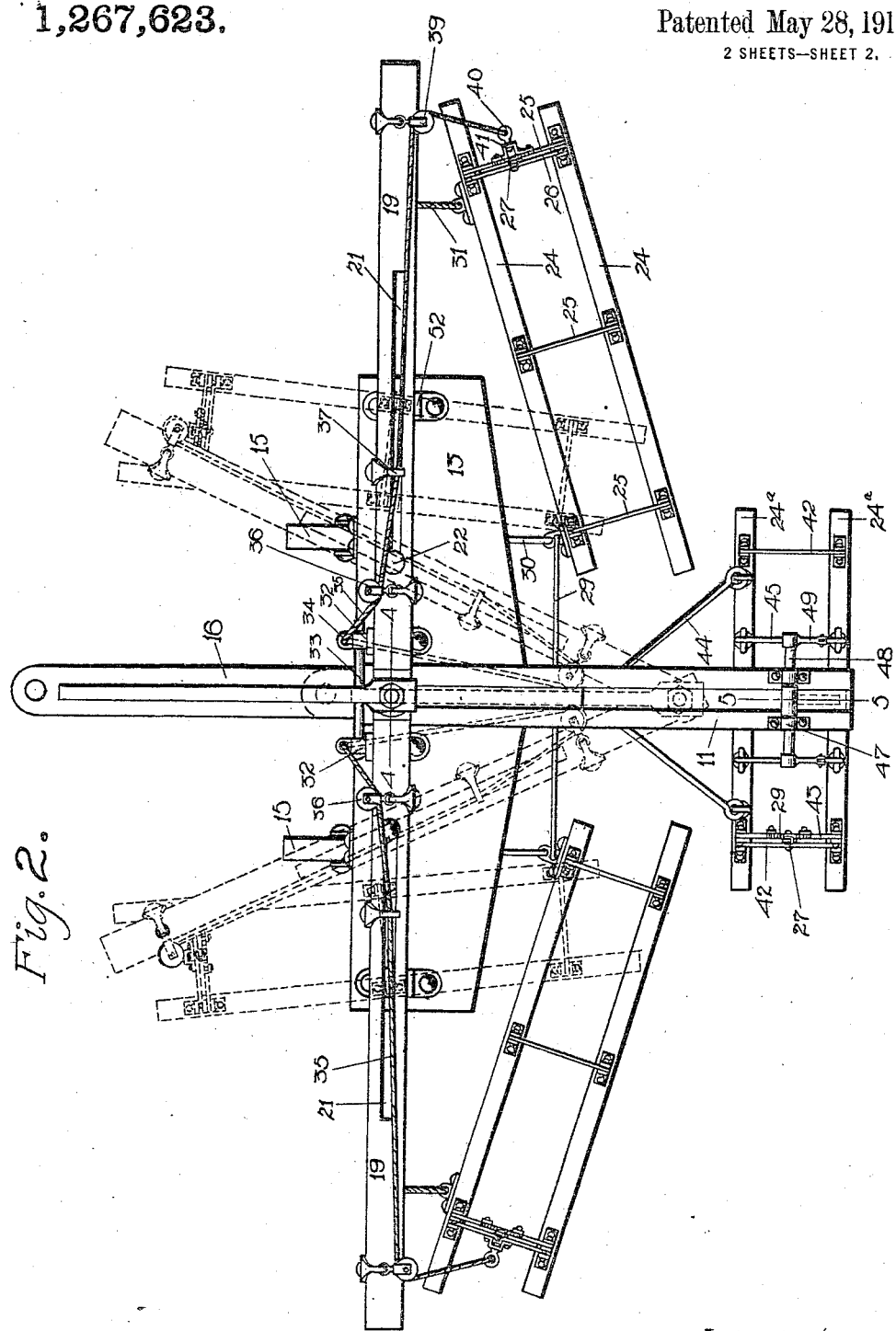
Fig. 2 shows a top or plan view of the same, the dotted lines showing the parts in adjusted positions.

The drag members now being described are preferably, when in use, normally arranged in the machine as shown in Fig. 2 on opposite sides of the frame members 10 and extending from their inner ends laterally and forwardly. The inner rear end of each of the drag members, now under consideration, has its forward angle-iron 24 pivoted to a link 29 extending laterally and upwardly and pivoted to the frame member 10, and is also pivoted to a link 30 extending upwardly and forwardly and pivoted to the platform 13.

The outer end of each of said drag members, hereinbefore described, is connected with the outer end of one of the slide bars 19 by a suitable device such for instance, the cable 31. The parts hereinbefore described are so arranged that when the slide bars 19 are in horizontal position transversely of the machine, the drag members will be dragged on the ground for dragging and leveling the same, and will stand in substantially the positions shown in Fig. 2. Extending forwardly from the main frame adjacent to the inner ends of the slide bars 19 are brackets 32 designed to receive a locking pin 33, which pin may be also selectively extended through one of the openings 17 in the draw bar.

Secured to the forward ends of the brackets 32 are fastening members 34, to which are secured ropes 35 or other flexible devices. Each rope 35 is extended around a pulley 36 and through a guide 37 on one of the slide bars 19, and is thence extended upwardly toward the outer end of said slide bar and around the pulley 39, around the upper end of the slide bar, and thence to an eye bolt 40 swiveled on a bracket 41 at the outer end of the adjacent drag member. The parts just described are so arranged that when the draw bar is shoved rearwardly, thereby rotating and sliding the slide bars on the pins 22, said slide bars will be moved to their position shown in Fig. 2.

The cables 35 are so arranged that when the parts are in their operative position, shown by full lines in Fig. 2, there is some slack in said cables. When, however, the parts are moved to their position shown by dotted lines in said figure, the position of the pulley 36 with relation to the fastening device 34 is such that each cable 35 is tightened, so that when the outer end of the bracket member connected with each cable is at its forward position of movement, it will be slightly lifted above the ground.

At the rear part of the machine behind the caster wheel 12 is a third drag member adapted to travel in a path overlapping the ends of the paths traveled by the drag members, already described. The third drag member comprises angle irons 24$^a$ similar in general construction to the drag members 24$^a$. The drag members 24$^a$ are connected near their ends by downwardly opening U-shaped connecting bars 42, similar to the bars 25 and similarly pivoted to the respective drag members 24$^a$.

Adjacent to one of the connecting bars 42 is a somewhat lower connecting bar 42. A lever 27 similar to that already described is operatively connected with the adjacent connecting bars 42 and 43, and has a pawl to coact with a sector 29 similar to that already mentioned. The forward drag member 24$^a$ is pivoted to links 44 rearwardly and upwardly and toward each other in the machine, and pivoted at their forward ends on the frame member 10.

Pivoted at their ends to the respective drag members 24$^a$ is a pair of downwardly opening U-shaped connecting bars 45. Connected with the central portion of each bar 45 is an upwardly extending arm 46.

On the frame members 11 are a pair of alined bearings 47, in which is mounted a rock shaft 48 having at its ends laterally extending arms 49, the rear ends of which are pivoted to the respective arms 46.

On the central portion of the shaft 48 between the brackets 47 is a downwardly extending engaging arm 50, extending through a suitable slot 51 in the central portion of the rear end of the member 10 in such position as to be engaged by the rear end of the draw bar when the draw bar is moved to its rearward limit of movement, for thereby rocking the shaft 48 for raising the arms 49 and 46 and lift the third drag member, which is located as shown, rearwardly of the first two described drag members.

In the practical operation of my improved drag and leveler, the parts are assembled in the position shown by full lines in Fig. 2, with the exception that the locking pin 33 may or may not be omitted as is desired.

On the platform 13 are stop devices 52 for engaging the rear edges of the slide bars 19, and spaced outwardly from the pins 22, as shown in Fig. 2, for preventing the forward movement of the draw bar 16 with relation to the frame of the machine beyond a certain predetermined point.

Figure 5:
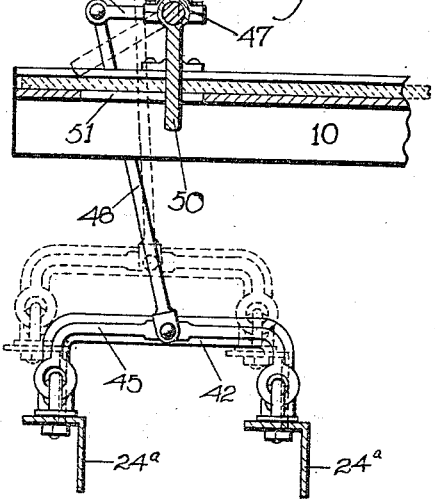
Fig. 5 shows a vertical, sectional view taken on the line 5—5 of Fig. 2, the drag member shown being illustrated in side elevation.

The entire device is designed to be used with a tractor and when the machine approaches a bridge or a gate or other passage where it is desirable to reduce the width of the machine, the tractor simply backs up thereby forcing the draw bar 16 rearwardly with relation to the machine. The rearward movement of the draw bar swings the inner ends of the slide bars 19 rearwardly until the slide bars assume the position shown by dotted lines in Fig. 2. The outer ends of the slide bars and the outer drag members are swung forwardly and inwardly, and the forward ends of the outer drag members are raised slightly by means of the cables 35. The rear end of the draw bar, in the rearward movement of such draw bar strikes the arm 50 forcing the same rearwardly and upwardly to its position shown by dotted lines in Fig. 5, thereby raising the rear, central drag member off the ground. The entire device is then in position to be drawn across a bridge, or through a gate, and the weight of the machine is carried by the wheels with practically no retardation of the progress of the machine by the drags. It will be seen that when the machine is in the position last described, the outer drag members travel almost like sled runners.

It should be understood in this connection that when the draw bar is moved to its rearward position of movement, the pin 33 is inserted through the members 32 and through one of the holes 17, preventing the forward, relative, sliding movement of the draw bar until it is desired to have the machine spread out again.

When the machine is on the road ready for work again, the pin 33 is removed and the forward movement of the tractor moves the drag and leveler parts to their operative positions.

The pin 33 need not be used while the machine is being drawn forwardly in dragging and leveling a road or the like.

The angles of the outer drag members may be regulated for giving them a variety of positions by selectively extending the pin 33 through different holes 17.

The positions of the members 24 and 24ᵃ may be regulated by means of the leveler 27.

It will be understood that some changes may be made in the construction, and arrangement of the parts of my improved drag and leveler without departing from the essential features and purposes of my invention, and it is my intention to cover by my present application any such modifications in structure or use of mechanical equivalents, as may be reasonably included within the scope of the claims of the patent to be issued upon my application.

I claim as my invention:

1. In a device of the class described, a frame supported on wheels, a draw bar slidably mounted for fore-and-aft movement on the frame, slide bars mounted on said frame between their ends for pivotal and sliding movement, the inner ends of said slide bars being pivotally connected with said draw bar, and ground working members having their outer ends operatively connected with the other ends of said slide bars whereby when a source of power hitched to said draw bar is moved rearwardly, said draw bar is slid rearwardly, the outer ends of said ground working members will be drawn forwardly and inwardly.

2. In a device of the class described, a frame supported on wheels, a draw bar slidably mounted for fore-and-aft movement on the frame, slide bars mounted on said frame between their ends for pivotal and sliding movement, the inner ends of said slide bars being pivotally connected with said draw bar, ground working members having their outer ends operatively connected with the outer ends of said slide bars whereby a source of power hitched to said draw bar is moved rearwardly and the outer ends of said ground working members will be drawn forwardly and inwardly, and means for connecting said ground working members with said slide bars whereby the outer ends of said implement members are automatically tilted upwardly as said ends move forwardly.

3. In a device of the class described, a frame mounted on wheels, a draw bar designed to be attached to a source of power, ground working members arranged diagonally on said machine, and means for operatively connecting said draw bar with said ground working members whereby when said draw bar is moved rearwardly by said source of power, the outer ends of said ground working members are swung toward the longitudinal central axis of the machine.

4. In a device of the class described, a frame mounted on wheels, a slidable draw bar mounted on said frame designed to be connected with a source of power, ground working members diagonally arranged on said device, means for pivotally supporting the inner ends of said ground working members on said frame, and means for operatively connecting the outer ends of said ground working members with said draw bar whereby when the draw bar is moved rearwardly, the outer ends of said ground working members may be swung toward the longitudinal central axis of the machine and also upwardly.

5. In a device of the class described, a frame, supporting wheels therefor, a draw bar slidably mounted for fore-and-aft movement on the frame, slide bars mounted for pivotal and sliding movement with their inner ends connected with said draw bar, bracket members operatively connected with said slide bars, a rear central bracket member supported on said frame, and means for automatically raising said last bracket member when the draw bar member is moved to its rearward position.

6. In a device of the class described, a frame supporting wheels therefor, a draw bar mounted for fore-and-aft movement on said frame, slide bars mounted between their ends on said frame for pivotal and sliding movement, the inner ends of said slide bars being pivotally connected with said draw bar, spaced ground working members having their inner ends pivotally connected with said frame, means for operatively connecting the outer ends of said members with the outer ends of said slide bars, guide members on said slide bars, and flexible devices secured to the outer ends of said ground working members and extended around said guide members and secured to said frame near the inner ends of said slide bars when the inner ends of the slide bars are in their forward positions.

7. In a device of the class described, a frame supporting wheels therefor, a draw bar mounted for fore-and-aft movement on said frame, slide bars mounted between their ends on said frame for pivotal and sliding movement, the inner ends of said slide bars being pivotally connected with said draw bar, spaced ground working members having their inner ends pivotally connected with said frame, means for operatively connecting the outer ends of said members with the outer ends of said slide bars, guide members on said slide bars, and flexible devices secured to the outer ends of said ground working members and extended around said guide members and secured to said frame whereby when the draw bar is slid rearwardly said flexible members will be tightened for raising the outer ends of said ground working members.

8. In a device of the class described, a frame, supporting wheels therefor, a draw bar slidably mounted for fore-and-aft movement on the frame, slide bars mounted for pivotal and sliding movement with their inner ends connected with said draw bar, bracket members operatively connected with said slide bars, a rear central bracket member supported on said frame, means for automatically raising said last bracket member when the draw bar member is moved to its rearward position, and means for locking said draw bar in various positions of its sliding movement.

9. In a device of the class described, a frame, supporting wheels therefor, a draw bar slidably mounted for fore-and-aft movement on the frame, slide bars mounted for pivotal sliding movement with their inner ends connected with said draw bar, bracket members operatively connected with said slide bars, for drawing the outer ends of said bracket members forwardly and inwardly in the machine, when the draw bar is moved rearwardly, and means for locking said draw-bar in various positions of its sliding movement.

Des Moines, Iowa, March 28, 1917.

ALPHEUS C. BOWEN.

Copies of this patent may be obtained for five cents each, by addressing the "Commissioner of Patents, Washington, D. C."